(12) United States Patent
Ochi

(10) Patent No.: US 10,036,868 B2
(45) Date of Patent: Jul. 31, 2018

(54) LENS BARREL AND OPTICAL APPARATUS

(71) Applicant: CANON KABUSHIKI KAISHA, Tokyo (JP)

(72) Inventor: Daisuke Ochi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 14/969,176

(22) Filed: Dec. 15, 2015

(65) Prior Publication Data

US 2016/0178865 A1   Jun. 23, 2016

(30) Foreign Application Priority Data

Dec. 17, 2014   (JP) ................. 2014-254669

(51) Int. Cl.
| | |
|---|---|
| G02B 7/02 | (2006.01) |
| G03B 11/04 | (2006.01) |
| G03B 17/12 | (2006.01) |
| G03B 17/14 | (2006.01) |

(52) U.S. Cl.
CPC ............ *G02B 7/021* (2013.01); *G03B 11/045* (2013.01); *G03B 17/12* (2013.01); *G03B 17/14* (2013.01)

(58) Field of Classification Search
CPC ...... G02B 7/021; G03B 11/045; G03B 17/12; G03B 17/14
USPC ................................................. 359/822–827
See application file for complete search history.

(56) References Cited

U.S. PATENT DOCUMENTS

| | | | | |
|---|---|---|---|---|
| 4,793,689 A * | 12/1988 | Aoyagi | ................. | G02B 7/08 310/317 |
| 5,777,801 A * | 7/1998 | Takemae | ................. | G02B 7/10 359/694 |
| 7,609,322 B2 | 10/2009 | Takada | | |
| 2012/0019932 A1* | 1/2012 | Yamanaka | ............ | G02B 5/005 359/694 |

FOREIGN PATENT DOCUMENTS

| | | |
|---|---|---|
| JP | 2004206011 A | 7/2004 |
| JP | 2005017955 A | 1/2005 |
| JP | 2012093484 A | 5/2012 |
| JP | 2014035371 A | 2/2014 |

* cited by examiner

*Primary Examiner* — Thomas K Pham
*Assistant Examiner* — Vipin Patel
(74) *Attorney, Agent, or Firm* — Rossi, Kimms & McDowell LLP

(57) ABSTRACT

The lens barrel includes a lens housing barrel including a first barrel portion and a second barrel portion having a diameter smaller than that of the first barrel portion, an external barrel disposed at an outer circumference of the lens housing barrel and extending from an object side further than the first barrel portion to the second barrel portion, and a first elastic member disposed between the external barrel and the second barrel portion and elastically deformable with a movement of the external barrel with respect to the lens housing barrel due to an external force from the object side. The lens barrel further includes a second elastic member disposed between the external barrel and the first barrel portion and elastically deformable with a movement of the external barrel with respect to the lens housing barrel due to an external force from a radially outer side.

12 Claims, 3 Drawing Sheets

LENS BARREL AND OPTICAL APPARATUS

BACKGROUND OF THE INVENTION

Field of the Invention

The present invention relates to an optical apparatus, such as an interchangeable lens and an image capturing apparatus, which includes a lens barrel having a structure that reduces an impact due to an external force.

Description of the Related Art

Lens barrels include ones having a structure that reduces an impact due to a large external force caused by falling, crash or the like in order to prevent occurrence of problems in optical performance and drive of a lens caused by the impact. Japanese Patent Laid-Open No. 2012-93484 discloses a structure in which an impact-absorbing portion formed by an elastic member is provided between, of a lens hood mounted on an object side tip of the lens barrel, a hood body and a mount portion mounted to the lens barrel. On the other hand, Japanese Patent Laid-Open No. 2004-206011 discloses a lens barrel having a drip-proof structure enabling use thereof in rain.

However, the structure having the impact-absorbing portion, which is disclosed in Japanese Patent Laid-Open No. 2012-93484, can reduce the impact due to the external force received by the lens hood from the object side, and, however, cannot sufficiently reduce an impact due to an external force from a direction other than the object side (for example, from a radially outer side).

On the other hand, the drip-proof structure disclosed in Japanese Patent Laid-Open No. 2004-206011 and other conventional drip-proof structures use an elastic member such as a rubber ring and a packing. Such a drip-proof elastic member, however, cannot sufficiently reduce the impact.

SUMMARY OF THE INVENTION

The present invention provides a lens barrel using an elastic member capable of sufficiently reducing an impact due to external forces not only from an object side but also from a radially outer side and of providing a drip-proof effect. The present invention further provides an optical apparatus including the lens barrel.

The present invention provides as an aspect thereof a lens barrel including a lens, a lens housing barrel including a first barrel portion to house the lens and a second barrel portion provided on an image side in an optical axis direction further than the first barrel portion and having a diameter smaller than that of the first barrel portion, an external barrel disposed at an outer circumference of the lens housing barrel and extending from an object side in the optical axis direction further than the first barrel portion to the second barrel portion, a first elastic member disposed between the external barrel and the second barrel portion and elastically deformable with a movement of the external barrel with respect to the lens housing barrel due to a first external force from the object side, and a second elastic member disposed between the external barrel and the first barrel portion and elastically deformable with a movement of the external barrel with respect to the lens housing barrel due to a second external force from a radially outer side.

The present invention provides as another aspect thereof an optical apparatus including the above lens barrel.

Further features and aspects of the present invention will become apparent from the following description of exemplary embodiments with reference to the attached drawings.

DESCRIPTION OF THE EMBODIMENTS

An exemplary embodiment of the present invention will be described below with reference to the attached drawings.

Figure 1:
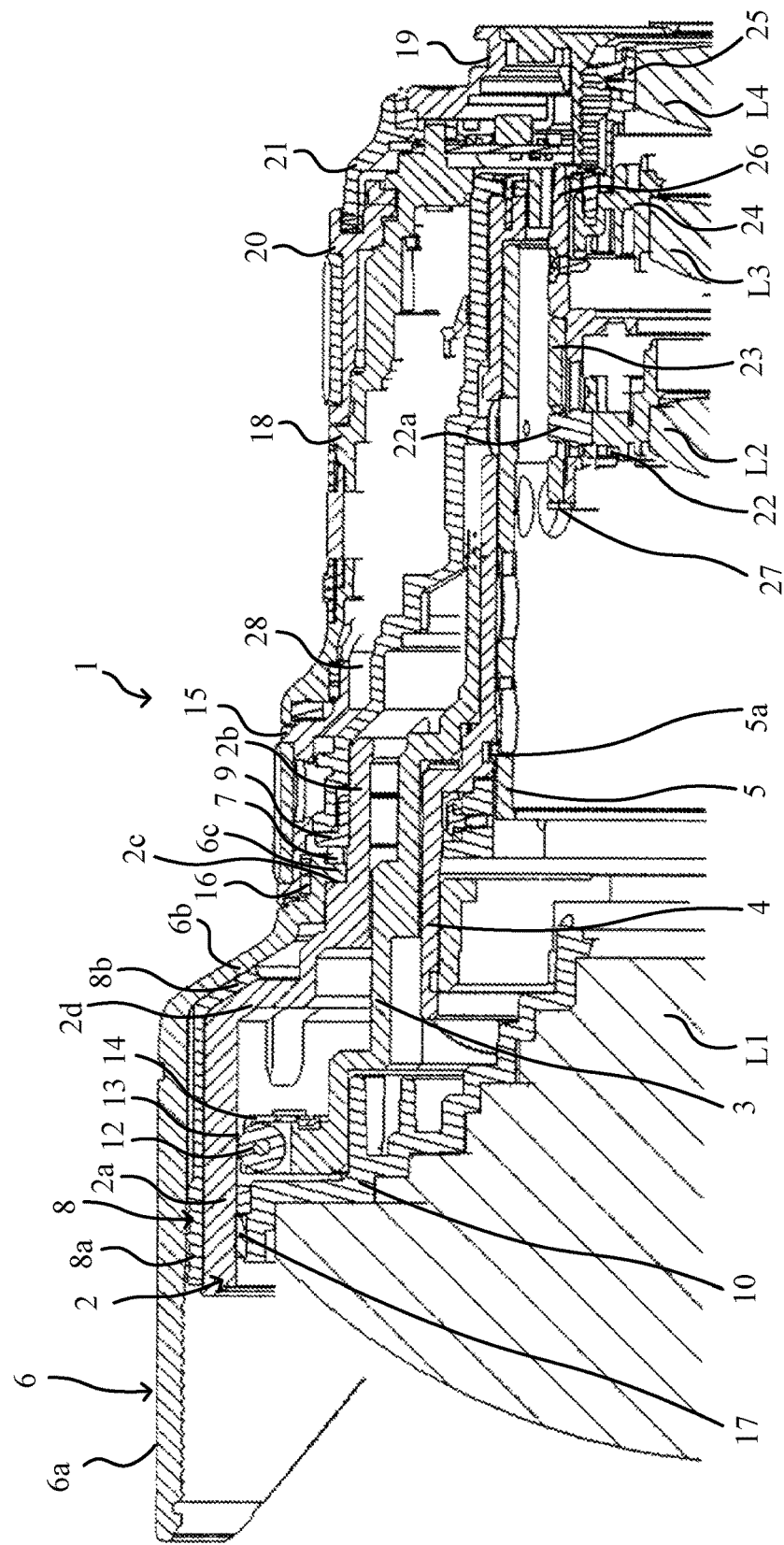
FIG. 1 is a sectional view of a lens barrel that is an embodiment of the present invention.

FIG. 1 illustrates a configuration of an interchangeable lens as an optical apparatus including a lens barrel that is an embodiment of the present invention.

An interchangeable lens 1 is detachably attached to a camera body (not illustrated) (single-reflex camera or a mirror-less camera). The interchangeable lens 1 includes the lens barrel and a mount 19 provided at a rear end (image side end) of the lens barrel and coupled to the camera body.

The lens barrel holds an image capturing optical system including, in order from an object side (left side of the drawing; hereinafter referred to also as "a front side") to an image side (right side of the drawing; hereinafter referred to also as "a rear side"), first to fourth lens units L1 to L4. The first to fourth lens units L1 to L4 are moved in an optical axis direction of the image capturing optical system to perform variation of magnification. The second lens unit L2 is moved in the optical axis direction to perform focusing. The interchangeable lens 1 of this embodiment is a so-called ultra wide-angle lens and includes the first lens unit L1 having a far larger outer diameter and a heavier weight compared with the lens units L2 to L4. In the following description, a direction orthogonal to the optical axis of the image capturing optical system is referred to also as "a radial direction", and a direction about the optical axis is referred to also as "a circumferential direction".

The mount 19 is screw-fixed to a base barrel 18 together with a flange back adjusting ring 21. A guide barrel 4 is screw-fixed to the base barrel 18. In an inner circumference of the guide barrel 4, a cam barrel 5 is disposed whose bayonet portion 5a enables rotation thereof about the optical axis of the image capturing optical system.

A linearly movable barrel 3 is disposed between the guide barrel 4 and the base barrel 18. The first lens unit L1 is held by a first unit holding frame 10, and the first unit holding frame 10 is screw-fixed to the linearly movable barrel 3. A linearly movable cam follower (not illustrated) is screw-fixed to the linearly movable barrel 3.

An adjustment barrel (lens housing barrel) 2 includes a first barrel portion 2a that houses, on its inner circumference side, the linearly movable barrel 3 and the first unit holding frame 10 (first lens unit L1) and a second barrel portion 2b that is provided on a rear side further than the first barrel portion 2a and whose outer diameter is smaller than that of the first barrel portion 2a. The adjustment barrel 2 includes, between the first and second barrel portions 2a and 2b, a connecting portion 2d that connects the first and second barrel portions 2a and 2b to each other and whose outer diameter reduces from the first barrel portion 2a to the second barrel portion 2b. The second barrel portion 2b is screw-fixed, in its inner circumference, to the guide barrel 4.

The adjustment barrel 2 is capable of adjustment of its eccentricity in the radial direction with respect to the guide barrel 4. Adjusting the eccentricity enables performing adjustment for making optical axes of the first to fourth lens units L1 to L4 coincide with one another.

The linearly movable barrel 3 has groove portions formed at three locations in the circumferential direction in a flange portion formed at a front end of the linearly movable barrel 3. In each of the three groove portions, a roller 13 that contacts an inner circumferential surface of the adjustment barrel 2 rollably in the optical axis direction and a roller shaft 12 that rotatably holds the roller 13 are disposed. The roller shaft 12 is held by a roller shaft fixer (folded sheet metal) 14 screw-fixed to the linearly movable barrel 3. The roller 13 is always pressed against the inner circumferential surface of the adjustment barrel 2 by a roller shaft biasing spring (not illustrated) that biases the roller shaft 12 toward the radially outer side.

In an inner circumference of the cam barrel 5, a focus cam barrel 23 is disposed. In the focus cam barrel 23, a focus cam groove portion is formed. The second lens unit L2 is held by a second unit holding frame 22 provided with a cam follower 22a engaging with the focus cam groove portion of the focus cam barrel 23.

The fourth lens unit L4 is held by a fourth unit holding frame 25 and fixed by adjusting screws to a third unit holding frame 24 that holds the third lens unit L3. Between the third unit holding frame 24 and the fourth unit holding frame 25, a washer (not illustrated) is sandwiched. Utilization of an elastic restoring force of the washer enables adjustment of a distance between the third and fourth lens units L3 and L4 through adjustment of a fastening amount of each adjusting screw.

The second unit holding frame 22 and the third unit holding frame 24 (and the fourth unit holding frame 25) are held by a rear unit holding frame 26. A focus cam barrel retainer (folded sheet metal) is fixed to a front end of the rear unit holding frame 26. The focus cam barrel 23 is sandwiched and held rotatably about the optical axis by the focus cam barrel retainer 27 and a middle surface of the rear unit holding frame 26, the middle surface being located at a middle part in the optical axis direction. The rear unit holding frame 26 is provided with a linearly movable cam follower (not illustrated).

In the guide barrel 4, a straight groove portion (not illustrated) is formed so as to extend in the optical axis direction. Similarly, in the cam barrel 5, a rear unit cam groove portion (not illustrated) and a linearly movable barrel cam groove portion are formed. The linearly movable cam followers provided to the rear unit holding frame 26 and the linearly movable barrel 3 both engage with the straight groove portion and respectively engage with the rear unit cam groove portion and the linearly movable barrel cam groove portion. With this configuration, when the cam barrel 5 is rotated, the rear unit holding frame 26 (i.e., the second to fourth lens units L2 to L4) and the linearly movable barrel 3 (i.e., the first lens unit L1) are linearly moved in the optical axis direction by lifts of the rear unit cam groove portion and the linearly movable barrel cam groove portion, respectively. Thereby, a zooming operation (variation of magnification) is performed.

A focus unit 28 is screw-fixed to the guide barrel 4. A manual ring 15 as a focus operation member is held rotatably about the optical axis with respect to the focus unit 28 at a fixed position in the optical axis direction. The focus unit 28 is constituted by a vibration-type motor and a differential mechanism. The focus unit 28 outputs, to a focus key (not illustrated), a rotation amount corresponding to a rotation amount of the vibration-type motor and a rotation amount of the manual ring 15. The focus key engages with a focus key engagement groove portion formed in the focus cam barrel 23. With this configuration, the focus cam barrel 23 is rotated by a driving force from the vibration-type motor in autofocus and is rotated by a force caused by a rotation operation of the manual ring 15 by a user in manual focusing. Consequently, the second unit holding frame 22 is moved in the optical axis direction together with the second lens unit L2 by a lift of the focus cam groove portion of the focus cam barrel 23 to perform focusing.

A zoom ring 20 is a zoom operation member for which a rotation operation is to be performed by the user and that is held by the base barrel 18 rotatably about the optical axis at a fixed position in the optical axis direction. A zoom key (not illustrated) is screw-fixed to the zoom ring 20. The zoom key engages with a zoom key engagement groove portion formed in the cam barrel 5. With this configuration, the rotation operation of the zoom ring 20 provides a rotation operation force to rotate the cam barrel 5. The rotation of the cam barrel 5 linearly moves the rear unit holding frame 26 (i.e., the second to fourth lens units L2 to L4) and the linearly movable barrel 3 (i.e., the first lens unit L1) in the optical axis direction. Thereby, the zoom operation is performed.

Reference numeral 6 denotes a lens hood as an external barrel. The lens hood 6 has a hood portion 6a disposed at an outer circumference of the first barrel portion 2a of the adjustment barrel 2 and a conical barrel portion (extending portion) 6b extending from the hood portion 6a, with its diameter reducing from that of the hood portion 6a, via an outer circumference of a connecting portion 2d of the adjustment barrel 2 to the outer circumference of the second barrel portion 2b. The hood portion 6a has a front end protruding further forward than the adjustment barrel 2 (first barrel portion 2a) and a front side lens surface of the first lens unit L1. In an inner circumferential portion of the conical barrel portion 6b, a washer receiving portion 6c is formed.

Between a rear end surface of the washer receiving portion 6c and a front end surface of a fixed ring member (receiving portion) 9 screw-fixed to an outer circumferential surface of the second barrel portion 2b of the adjustment barrel 2, a wave washer 7 that is a first elastic member is disposed in a state of being slightly compressed (elastically deformed) in the optical axis direction. The washer receiving portion 6c has a front end surface pressed by an elastic restoring force received from the wave washer 7 against a stopper surface 2c formed in the second barrel portion 2b of the adjustment barrel 2 so as to face rearward.

In this embodiment, although the fixed ring member 9 is fabricated as a member independent of the adjustment barrel 2, since the fixed ring member 9 is screw-fixed to the second barrel portion 2b of the adjustment barrel 2 to be integrated with the adjustment barrel 2, the fixed ring member 9 can be regarded as part of the adjustment barrel 2 (second barrel portion 2b). That is, when an independent member is fixed to and integrated with the lens housing barrel, the independent member is regarded as part of the lens housing barrel. Alternatively, a receiving portion corresponding to the fixed ring member 9 may be integrally formed on the adjustment barrel 2 (second barrel portion 2b) in advance.

Furthermore, between an inner circumferential surface of the lens hood 6 and an outer circumferential surface of the adjustment barrel 2 (the first barrel portion 2a and the connecting portion 2d), a rubber barrel 8 that is a second elastic member is disposed. The rubber barrel 8 has a cylindrical portion (first portion) 8a on its front side and a conical barrel portion (second portion) 8b on its rear side.

The cylindrical portion 8a has a cylindrical shape that continues in the circumferential direction without any gap in a space (gap) extending in the circumferential direction between the inner circumferential surface of the hood portion 6a and the outer circumferential surface of the first barrel portion 2a and that extends in the optical axis direction. The cylindrical portion 8a is disposed in a state of being slightly compressed (elastically deformed) in the radial direction that is a direction of its thickness between the inner circumferential surface of the hood portion 6a and the outer circumferential surface of the first barrel portion 2a. With this configuration, an outer circumferential surface (a large number of convex portions in a first area described later) and an inner circumferential surface of the cylindrical portion 8a respectively tightly contact the inner circumferential surface of the hood portion 6a and the outer circumferential surface of the first barrel portion 2a.

The conical barrel portion 8b of the rubber barrel 8 is disposed between a circular truncated cone shaped outer circumferential surface of the connecting portion 2d of the adjustment barrel 2 and an inner circumferential surface of the conical barrel portion 6b of the lens hood 6.

Onto the outer circumferential surface of the conical barrel portion 6b of the lens hood 6, a sealing cloth 16 is wrapped. An outer circumferential surface of the sealing cloth 16 slidably contacts an inner circumferential surface of the manual ring 15 rotatable about the optical axis. The sealing cloth 16 is provided in order to prevent intrusion of water and dust from a gap between the conical barrel portion 6b and the manual ring 15.

Similarly, onto a front end side outer circumferential surface of the first unit holding frame 10, a sealing cloth 17 is wrapped. The sealing cloth 17 has an outer circumferential surface that contacts the outer circumferential surface of the first barrel portion 2a of the adjustment barrel 2. The sealing cloth 17 is provided in order to prevent intrusion of water and dust from a gap between the first unit holding frame 10 and the first barrel portion 2a.

Figure 2:
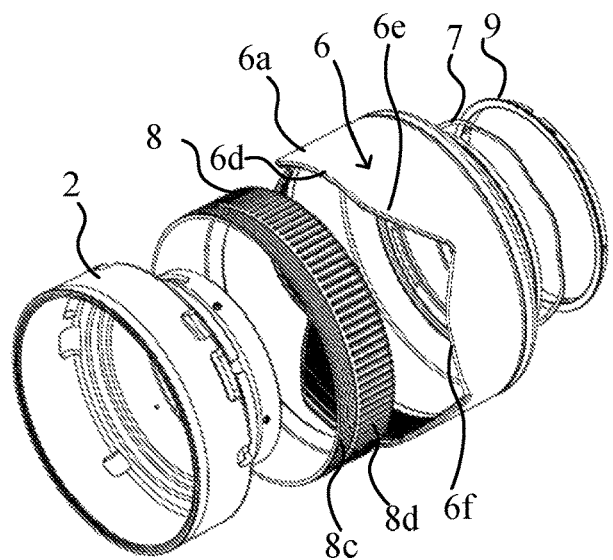
FIG. 2 is an exploded perspective view of a main part of the lens barrel of the embodiment.

With reference to FIG. 2, a detailed description will be made of a shape of the lens hood 6. The hood portion 6a of the lens hood 6 has long side portions 6d each extending in the circumferential direction at a frontmost protruding position and short side portions 6e extending obliquely rearward at both circumferential ends of each of the long side portions 6d. The two sets of the long side portions 6d and the short side portions 6e are provided on mutually opposite sides in the radial direction. Between the two short side portions 6e, an arc portion 6f is formed which protrudes forward in a shape of arc from a rear end of the short side portion 6e to a position more rearward than the long side portion 6d. Such a shape of the hood portion 6a is referred to also as "a petal shape". The hood portion 6a having such a petal shape prevents a strong unwanted light from outside of an object area to be captured from entering the image capturing optical system.

Figure 3:
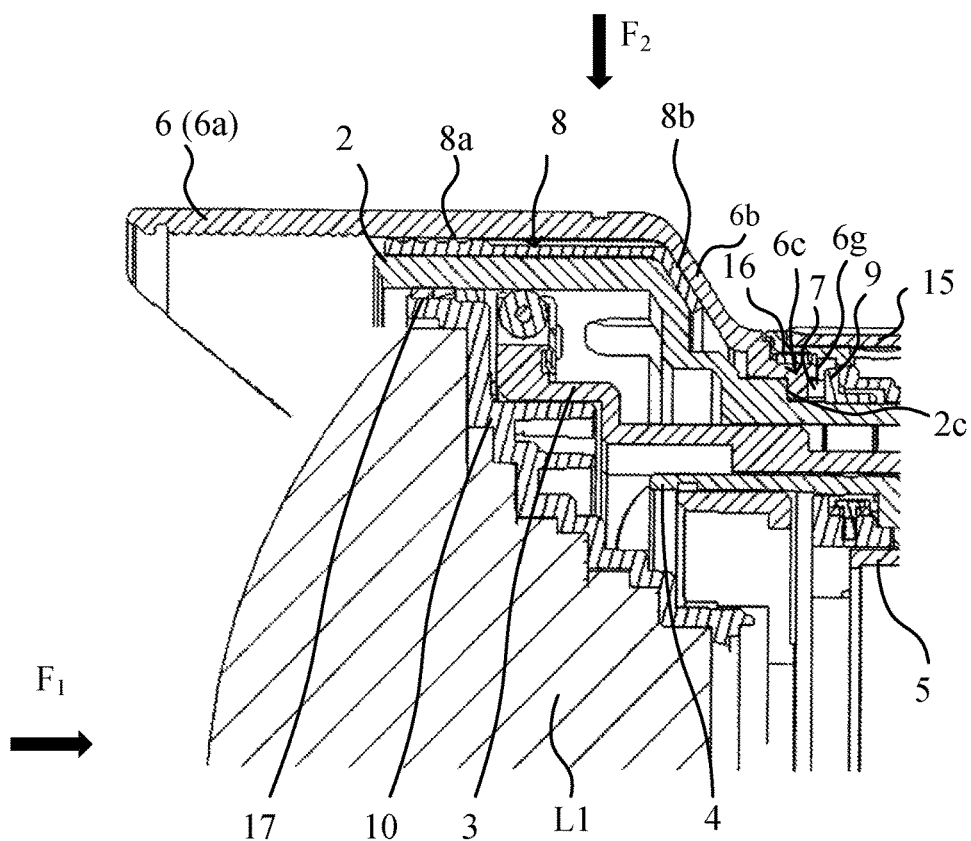
FIG. 3 is a sectional view of the main part.

With reference to FIG. 3, description will be made of an impact-reducing function of the wave washer 7 and the rubber barrel 8. Upon receipt of an external force (first external force) F1 from a front side (object side) due to, for example, falling of the interchangeable lens 1 to the ground, the lens hood 6 is moved rearward with respect to the adjustment barrel while elastically deforming the wave washer 7 disposed between the washer receiving portion 6c of the lens hood 6 and the fixed ring member 9 (i.e., the adjustment barrel 2). As a result of the elastic deformation of the wave washer 7, the external force F1 acting on the lens hood 6 is absorbed, and consequently the impact is reduced.

Meanwhile, the conical barrel portion 6b of the lens hood 6 moved rearward is likely to contact the front end of the manual ring 15. However, since the external force F1 has been absorbed by the elastic deformation of the wave washer 7, an external force transferred to the manual ring 15 in this case is smaller than that in a case where the wave washer 7 is not provided and thus has almost no influence on the manual ring 15.

In a state in which the external force F1 is not acting on the lens hood 6 as illustrated in FIG. 3, a part (stopper surface) 6g not contacting the wave washer 7 in the rear end surface of the washer receiving portion 6c may be placed closer to the front end surface of the fixed ring member 9 than a position illustrated in the drawing. This configuration allows the stopper surface 6g to contact the front end surface of the fixed ring member 9 before the conical barrel portion 6b of the lens hood 6 contacts the front end of the manual ring 15 when the lens hood 6 is moved rearward by the external force F1. That is, this configuration enables protecting the manual ring 15 by preventing the conical barrel portion 6b from contacting the manual ring 15.

On the other hand, when an external force (second external force) F2 acts on the lens hood 6 from the radially outer side as a result of the falling or the like, the lens hood 6 is moved (deformed) in the radial direction with respect to the adjustment barrel 2 while elastically deforming the rubber barrel 8 in its thickness direction, which is disposed between the hood portion 6a and the first barrel portion 2a of the adjustment barrel 2. Also in this case, as a result of the elastic deformation of the rubber barrel 8, the external force F2 acting on the lens hood 6 is absorbed and consequently the impact applied to the first barrel portion 2a is reduced. If the rubber barrel 8 is not provided, a large impact is directly applied to the first barrel portion 2a of the adjustment barrel 2. The first barrel portion 2a houses thereinside the linearly movable barrel 3 and the first unit holding frame 10 fixed thereto. For this reason, the application of the large impact to the first barrel portion 2a has a large influence on the linearly movable barrel 3 and the first unit holding frame 10, and thus may deteriorate an optical performance and may hinder the movement of the linearly movable barrel 3 (i.e., of the first lens unit L1) in the optical axis direction. This embodiment, which enables reducing the impact by the rubber barrel 8, makes it possible to avoid such problems.

As described above, this embodiment disposes the conical barrel portion 8b of the rubber barrel 8 between the outer circumferential surface of the connecting portion 2d of the adjustment barrel 2 and the inner circumferential surface of the conical barrel portion 6b of the lens hood 6. This configuration enables preventing the conical barrel portion 6b of the lens hood 6 from being made contact strongly to the connecting portion 2d of the adjustment barrel 2 by the conical barrel portion 8b of the rubber barrel 8 even when the lens hood 6 is moved so as to tilt with respect to the adjustment barrel 2 as a result of the application of the external force F2 to the lens hood 6 from the radially outer side. This enables more effectively preventing the impact from being transferred to the first barrel portion 2a.

Figure 4:
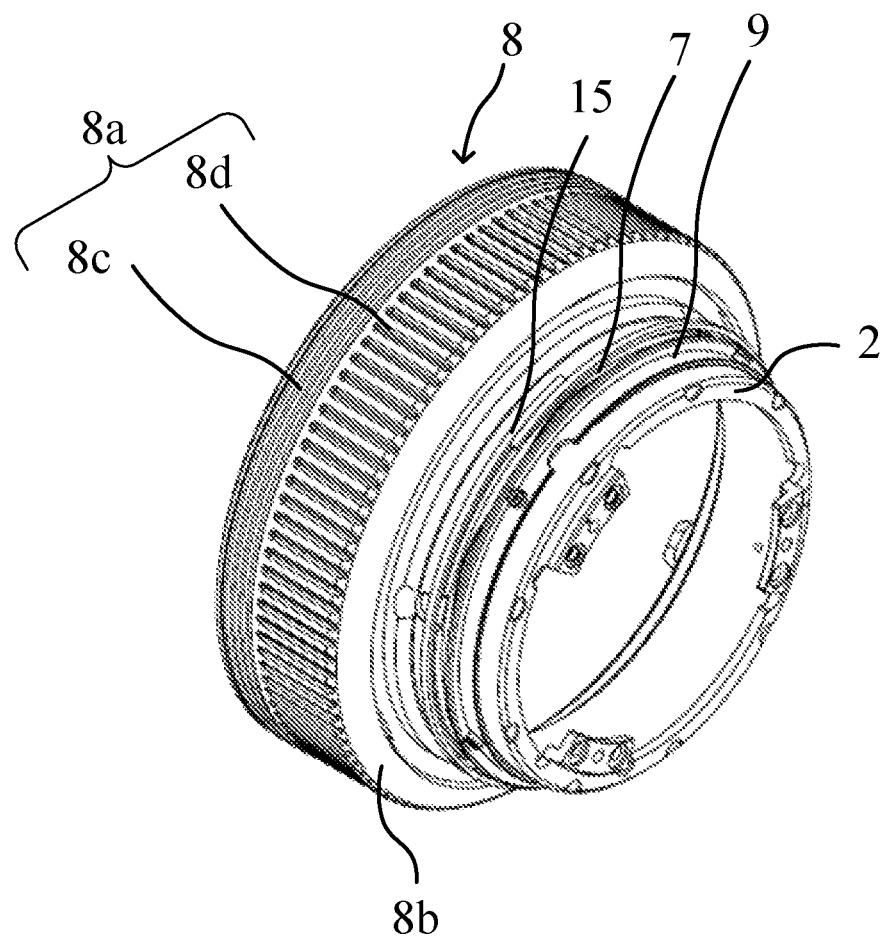
FIG. 4 is a perspective view of the main part.

With reference to FIG. 4, description will be made of a more detailed shape and a drip-proof function of the rubber barrel 8. As described above, the rubber barrel 8 has the cylindrical portion 8a on its front side. On a front side portion of the outer circumferential surface of the cylindrical portion 8a, a first area 8c is provided in which a large number of convex portions arranged in both the circumferential direction and the optical axis direction like a diamond knurl (or a cross knurl) are formed. The large number of convex portions are slightly elastically deformed (crushed) as a result of the cylindrical portion 8a being slightly compressed between the hood portion 6a and the first barrel portion 2a of the adjustment barrel 2, thereby tightly contacting the inner circumferential surface of the hood portion 6a. Moreover, these large number of crushed convex portions tightly contact (in other words, join with) one another in the circumferential direction. Consequently, the inner circumferential surface of the cylindrical portion 8a tightly contacts the outer circumferential surface of the first barrel portion 2a. This enables achieving a drip-proof structure that prevents water intrusion from the gap between the hood portion 6a and the first barrel portion 2a into the lens barrel. As just described, the rubber barrel 8 has both the function of reducing the impact due to the external force from the radially outer side and the function of achieving the drip-proof between the lens hood 6 and the adjustment barrel 2. Furthermore, on a rear side of the outer circumferential surface of the cylindrical portion 8a further than the first area 8c, a second area 8d is provided in which multiple (in other words, a large number of) concave groove portions evenly spaced in the circumferential direction and each extending in the optical axis direction are formed like a straight knurl. In assembling of the lens barrel, the hood portion 6a is assembled from rearward on an outer circumferential surface of the rubber barrel 8 assembled on the outer circumferential surface of the first barrel portion 2a while compressing the rubber barrel 8. In the assembling of the hood portion 6a, the large number of concave groove portions formed in the second area 8d so as to each extend in the optical axis direction reduces a contact area between the rubber barrel 8 and the hood portion 6a, that is, reduces a resistance therebetween. This reduction in the resistance enables improving ease of assembly of the lens barrel.

The first area 8c is not necessarily required to be provided to the rubber barrel 8 as long as the drip-proof effect between the hood portion 6a and the first barrel portion 2a is secured. Similarly, the second area 8d is not necessarily required to be provided. Alternatively, the first and second areas 8c and 8d may be provided on the inner circumferential surface of the cylindrical portion 8a (in other words, it is only necessary to provide the first and second areas 8c and 8d on at least one of the outer and inner circumferential surfaces of the cylindrical portion 8a). Moreover, when the lens hood 6 can be assembled to the first barrel portion 2a from the front side, the second area 8d may be provided further forward than the first area 8c.

This embodiment enables sufficiently reducing not only the impact due to the external force acting on the lens hood 6 from the object side by the wave washer 7, but also the impact due to the external force acting on the lens hood 6 from the radially outer side by the rubber barrel 8. Moreover, this embodiment enables achieving a sufficient drip-proof effect between the lens hood 6 and the adjustment barrel 2, without requiring a drip-proof-dedicated member (part) and making the drip-proof structure complex.

Although this embodiment described, as an example, the lens hood serving as the external barrel, the external barrel may be a member other than the lens hood.

In addition, although this embodiment described the case of using the wave washer 7 as the first elastic member, the first elastic member other than the wave washer 7 (for example, a member made of rubber) may be used.

Moreover, the configuration of the image capturing optical system in the lens barrel and the configuration for moving each of the lens units both described in this embodiment are merely examples, and thus alternative configurations may be employed.

Furthermore, although this embodiment described the lens barrel of the interchangeable lens, the present invention can be applied also to lens barrels used for a lens-integrated image capturing apparatus (optical apparatus) provided with an image sensor (a CMOS sensor or a CCD sensor) that receives light from the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254669, filed on Dec. 17, 2014, which is hereby incorporated by reference herein in its entirety.

What is claimed is:

1. A lens barrel comprising:
   a lens;
   a lens housing barrel including (a) a first barrel portion to house the lens and (b) a second barrel portion provided on an image side in an optical axis direction further than the first barrel portion and having a diameter smaller than that of the first barrel portion;
   an external barrel disposed at an outer circumference of the lens housing barrel and extending from an object side in the optical axis direction further than the first barrel portion to the second barrel portion;
   a first elastic member disposed between the external barrel and a part of the second barrel portion or a member fixed to the second barrel portion and elastically deformable with a movement of the external barrel with respect to the lens housing barrel due to a first external force from the object side; and
   a second elastic member disposed between the external barrel and the first barrel portion such that the second elastic member contacts an inner surface, which extends along the optical axis direction, of the external barrel and an outer surface, which extends along the optical axis direction, of the first barrel portion and being elastically deformable with a movement of the external barrel with respect to the lens housing barrel due to a second external force from a radially outer side.

2. The lens barrel according to claim 1, wherein the second elastic member includes a first portion that (a) continues in a circumferential direction without any gap in a space extending in the circumferential direction between the external barrel and the first barrel portion and (b) has a cylindrical shape extending in the optical axis direction.

3. The lens barrel according to claim 1,
   wherein:
   the lens housing barrel includes a connecting portion that connects the first and second barrel portions to each other and whose outer diameter reduces from the first barrel portion to the second barrel portion; and
   the second elastic member includes a second portion disposed between the connecting portion and an extending portion of the external barrel, the extending portion extending along an outer circumference of the connecting portion.

4. The lens barrel according to claim 1, wherein a first area is provided on at least one of an outer circumferential surface and an inner circumferential surface of the second elastic member, the first area including multiple convex portions arranged in each of a circumferential direction and the optical axis direction.

5. The lens barrel according to claim 4, wherein a second area is provided on the at least one of the outer circumferential surface and the inner circumferential surface of the second elastic member, the second area including multiple concave groove portions each of which extends in the optical axis direction and which are arranged in the circumferential direction on the image side or the object side further than the first area.

6. The lens barrel according to claim 1,
wherein:
an operation member rotatably operable in a circumferential direction is disposed at an outer circumference of the second barrel portion, and
a receiving portion, as the part of the second barrel portion or the member fixed to the second barrel portion, provided in the second barrel portion and receiving the first elastic member contacts the external barrel moved due to the first external force from the object side, thereby preventing the external barrel and the operation member from contacting to each other.

7. An optical apparatus including a lens barrel, the lens barrel comprising:
a lens;
a lens housing barrel including (a) a first barrel portion to house the lens and (b) a second barrel portion provided on an image side in an optical axis direction further than the first barrel portion and having a diameter smaller than that of the first barrel portion;
an external barrel disposed at an outer circumference of the lens housing barrel and extending from an object side in the optical axis direction further than the first barrel portion to the second barrel portion;
a first elastic member disposed between the external barrel and a part of the second barrel portion or a member fixed to the second barrel portion and elastically deformable with a movement of the external barrel with respect to the lens housing barrel due to a first external force from the object side; and
a second elastic member disposed between the external barrel and the first barrel portion such that the second elastic member contacts an inner surface, which extends along the optical axis direction, of the external barrel and an outer surface, which extends along the optical axis direction, of the first barrel portion and being elastically deformable with a movement of the external barrel with respect to the lens housing barrel due to a second external force from a radially outer side.

8. The optical apparatus according to claim 7, further comprising:
another lens; and
an operation ring to be operated to drive the other lens.

9. The optical apparatus according to claim 8, wherein the operation ring does not contact both of the lens housing barrel and the external barrel.

10. The optical apparatus according to claim 7, further comprising an image sensor to which light passing through the other lens is introduced.

11. A lens barrel comprising:
a lens;
a lens housing barrel including (a) a first barrel portion to house the lens and (b) a second barrel portion provided on an image side in an optical axis direction further than the first barrel portion and having a diameter smaller than that of the first barrel portion;
an external barrel disposed at an outer circumference of the lens housing barrel and extending from an object side in the optical axis direction further than the first barrel portion to the second barrel portion; and
an elastic member,
wherein:
the lens housing barrel includes a connecting portion that connects the first and second barrel portions to each other and whose outer diameter reduces from the first barrel portion to the second barrel portion; and
the elastic member includes (a) a first elastic portion disposed between the external barrel and the first barrel portion and being elastically deformable with a movement of the external barrel with respect to the lens housing barrel due to a first external force from a radially outer side and (b) a second elastic portion extending from the first elastic portion and being disposed between the connecting portion and an extending portion of the external barrel, the extending portion extending along an outer circumference of the connecting portion, and being elastically deformable with the movement of the external barrel with respect to the lens housing barrel due to a second external force from the object side.

12. An optical apparatus including a lens barrel, the lens barrel comprising:
a lens;
a lens housing barrel including (a) a first barrel portion to house the lens and (b) a second barrel portion provided on an image side in an optical axis direction further than the first barrel portion and having a diameter smaller than that of the first barrel portion;
an external barrel disposed at an outer circumference of the lens housing barrel and extending from an object side in the optical axis direction further than the first barrel portion to the second barrel portion; and
an elastic member,
wherein:
the lens housing barrel includes a connecting portion that connects the first and second barrel portions to each other and whose outer diameter reduces from the first barrel portion to the second barrel portion; and
the elastic member includes (a) a first elastic portion disposed between the external barrel and the first barrel portion and being elastically deformable with a movement of the external barrel with respect to the lens housing barrel due to a first external force from a radially outer side and (b) a second elastic portion extending from the first elastic portion and being disposed between the connecting portion and an extending portion of the external barrel, the extending portion extending along an outer circumference of the connecting portion, and being elastically deformable with the movement of the external barrel with respect to the lens housing barrel due to a second external force from the object side.

* * * * *